United States Patent
Witelson et al.

(10) Patent No.: US 11,505,960 B2
(45) Date of Patent: *Nov. 22, 2022

(54) POOL CLEANING SYSTEM

(71) Applicant: MAYTRONICS LTD., Kibbutz Yizrael (IL)

(72) Inventors: Shay Witelson, Kibbutz Yizrael (IL); Yair Hadari, Kibbutz Hulata (IL)

(73) Assignee: MAYTRONICS LTD., Kibbutz Yizrael (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,892

(22) Filed: Apr. 18, 2021

(65) Prior Publication Data

US 2021/0317675 A1 Oct. 14, 2021

Related U.S. Application Data

(63) Continuation of application No. 16/278,861, filed on Feb. 19, 2019, now Pat. No. 10,982,456.

(60) Provisional application No. 62/643,764, filed on Mar. 16, 2018.

(51) Int. Cl.
*E04H 4/16* (2006.01)
*H02J 50/10* (2016.01)
*B60L 53/12* (2019.01)
*G05D 1/02* (2020.01)

(52) U.S. Cl.
CPC ............ *E04H 4/1672* (2013.01); *B60L 53/12* (2019.02); *E04H 4/1654* (2013.01); *G05D 1/0206* (2013.01); *H02J 50/10* (2016.02)

(58) Field of Classification Search
CPC .................................................. E04H 4/1672

USPC ................. 4/490, 492, 488; 482/55; 15/1.7; 134/167

See application file for complete search history.

(56) References Cited

U.S. PATENT DOCUMENTS

| | | |
|---|---|---|
| 4,900,432 A | 2/1990 | Arnold et al. |
| 5,143,605 A | 9/1992 | Masciarelli |
| 6,942,790 B1 | 9/2005 | Dolton |
| 7,118,678 B2 | 10/2006 | Porat |
| 7,346,938 B2 | 3/2008 | Mattson, Jr. et al. |
| 7,409,853 B2 | 8/2008 | Biberger et al. |
| 7,504,025 B2 | 3/2009 | Burgassi |
| 9,073,614 B2 | 7/2015 | Kauffman |

(Continued)

OTHER PUBLICATIONS

Liu, "Qi Wireless Charging Range Extended to 40 mm," https://slashgear.com/Apr. 20, 2012.

(Continued)

*Primary Examiner* — Lori L Baker
(74) *Attorney, Agent, or Firm* — Reches Patents

(57) ABSTRACT

A method for charging a pool cleaning robot, the method may include positioning a first wireless charging element of a pool cleaning robot within a charging range of a second wireless charging element of a floating unit; wherein the floating unit is electrically and mechanically coupled to an external power source, wherein the positioning comprises moving at least one of the pool cleaning robot and the floating unit; and wirelessly charging, by the second wireless charging element, the first wireless charging element, wherein the charging occurs while maintaining the first wireless charging element within the charging range of the floating unit, despite movements of the floating unit.

15 Claims, 15 Drawing Sheets

(56) References Cited

U.S. PATENT DOCUMENTS

| | | |
|---|---|---|
| 9,399,877 B2 | 7/2016 | Erlich et al. |
| 9,487,963 B2 | 11/2016 | Michelon |
| 9,631,389 B2 | 4/2017 | Mastio et al. |
| 9,758,980 B2 | 9/2017 | Don et al. |
| 9,791,840 B2 | 10/2017 | Michelon |
| 9,887,505 B2 | 2/2018 | Favie et al. |
| 9,902,477 B1 | 2/2018 | Durvasula et al. |
| 9,963,898 B2 | 5/2018 | Li |
| 9,976,271 B2 | 5/2018 | Casadio et al. |
| 9,977,433 B1 | 5/2018 | Teuscher |
| 10,075,019 B2 | 9/2018 | Buenrostro et al. |
| 10,370,865 B2 | 8/2019 | Roumagnac |
| 2013/0110319 A1 | 5/2013 | Michelon |
| 2014/0303810 A1 | 10/2014 | Meijden et al. |
| 2015/0346726 A1 | 12/2015 | Davoodi et al. |
| 2016/0060887 A1 | 3/2016 | Tryber et al. |
| 2016/0145884 A1 | 5/2016 | Erlich et al. |
| 2016/0225469 A1 | 8/2016 | Bayo et al. |
| 2016/0289988 A1 | 10/2016 | Maggeni et al. |
| 2017/0022728 A1 | 1/2017 | Simik et al. |
| 2017/0057760 A1* | 3/2017 | Maggeni .................. B66D 1/00 |
| 2017/0114560 A1 | 4/2017 | Bayo et al. |
| 2017/0212523 A1 | 7/2017 | Witelson |
| 2017/0293490 A1 | 10/2017 | Hanan et al. |
| 2017/0365150 A1 | 12/2017 | Bennett et al. |
| 2018/0071908 A1 | 3/2018 | Goldenberg et al. |
| 2018/0135325 A1 | 5/2018 | Schloss et al. |
| 2018/0224856 A1 | 8/2018 | Durvasula et al. |
| 2018/0229160 A1 | 8/2018 | Witelson et al. |
| 2018/0266131 A1 | 9/2018 | Witelson et al. |
| 2019/0087548 A1 | 3/2019 | Bennett et al. |
| 2019/0106897 A1 | 4/2019 | Dov |
| 2019/0145119 A1* | 5/2019 | Kehati .................. C02F 1/001 15/1.7 |
| 2019/0161988 A1 | 5/2019 | Attar et al. |
| 2019/0271169 A1 | 9/2019 | Witelson et al. |
| 2019/0286119 A1 | 9/2019 | Cole et al. |

OTHER PUBLICATIONS

N., Pam, "Spatial Relationships." https://pyschologydictionary.org/spatial-relationships/#...Apr. 13, 2013.

* cited by examiner

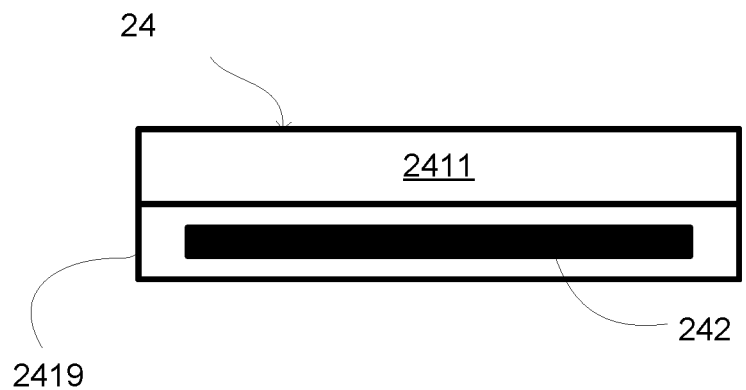
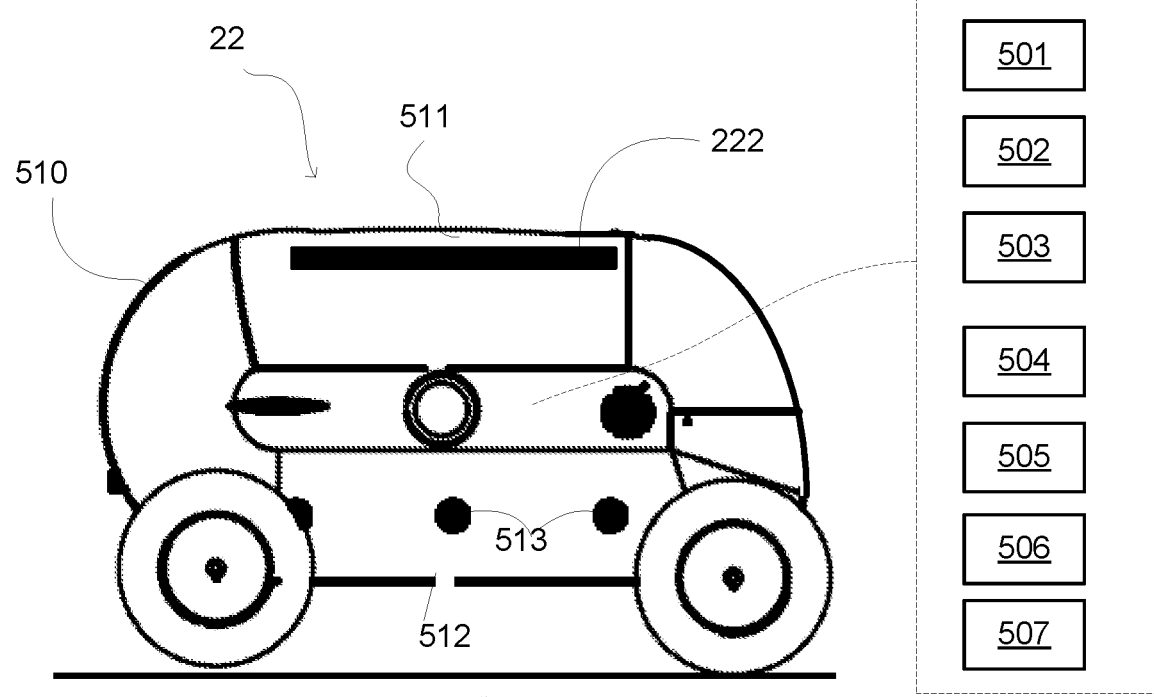
FIG. 6

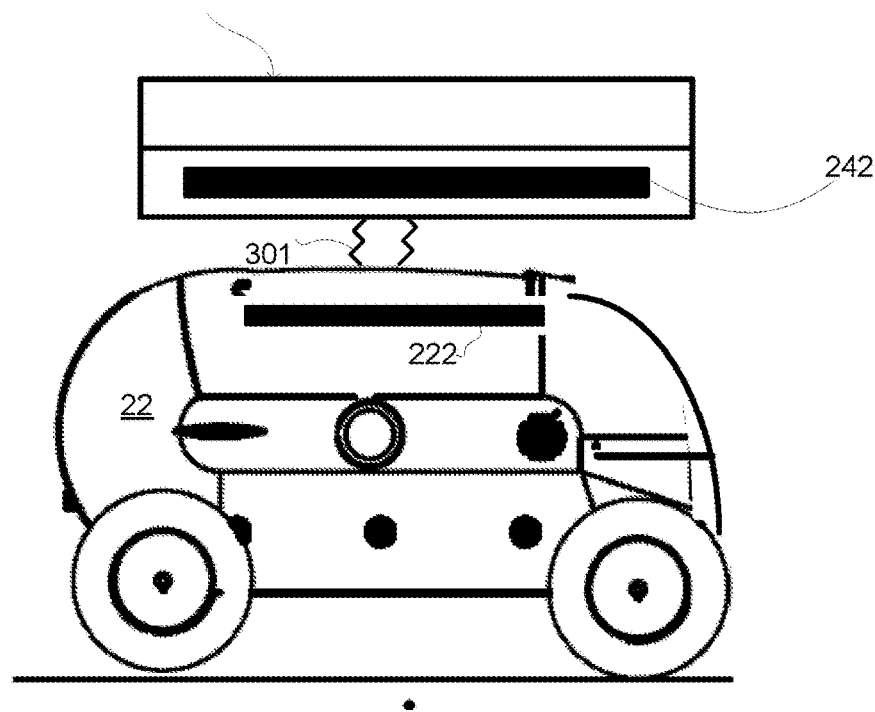
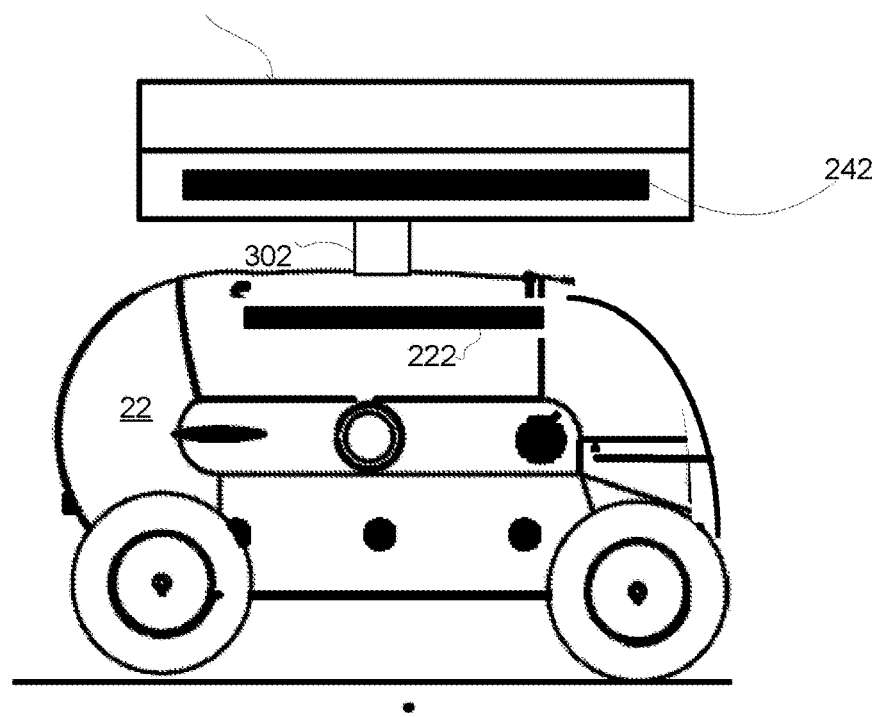
FIG. 12

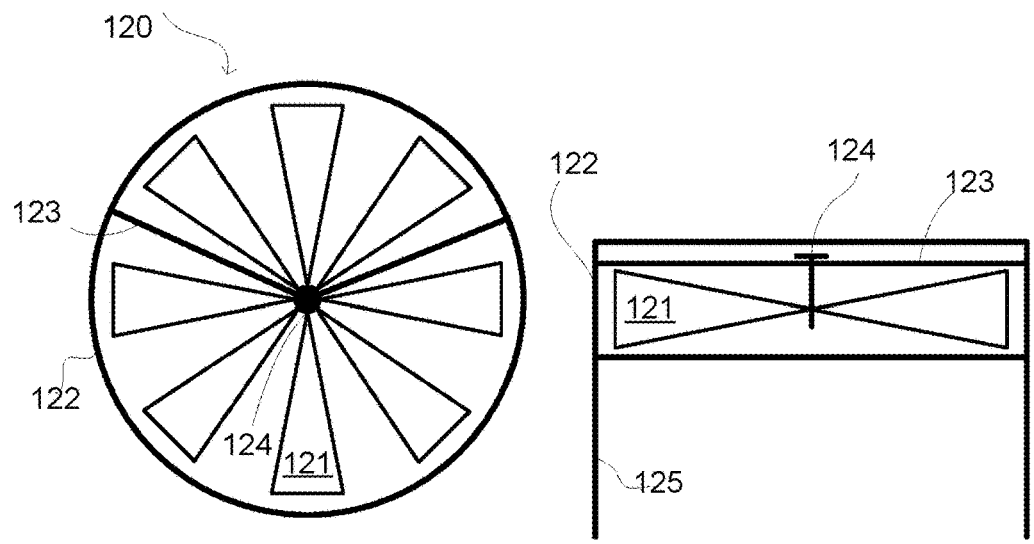
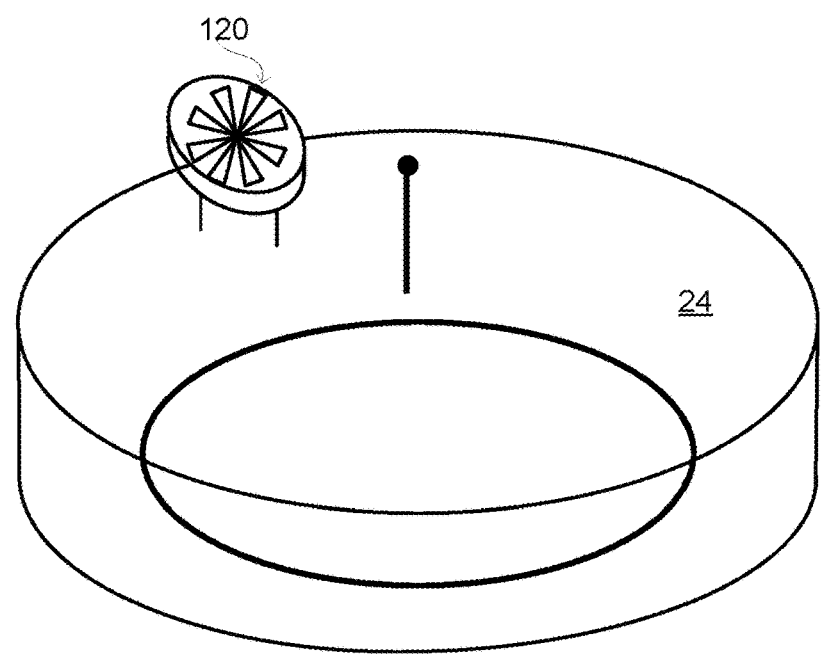
FIG. 14

POOL CLEANING SYSTEM

CROSS REFERENCE

This application claims priority from U.S. provisional patent 62/643,764 filing date Mar. 16, 2018.

BACKGROUND

Pool cleaning robots are adapted for use for cleaning a pool while being connected to electrical power cables or to a hose of a suction system. The hose and/or power cable can get tangled and may temporarily limit the usage of the pool.

There is a growing need to provide efficient charging systems and methods for charging pool cleaning robots.

SUMMARY OF THE INVENTION

There may be provided a pool cleaning system that may include a floating inductive charger whereby the pool cleaning robot can autonomously and automatically attach itself to the said charger in order to charge its on-board batteries and disengage from the said charger to continue cleaning the pool. A more detailed description is given below.

BRIEF DESCRIPTION OF THE DRAWINGS

In order to understand the invention and to see how it may be carried out in practice, an embodiment will now be described, by way of a non-limiting example only, with reference to the accompanying drawings, in which:

FIG. 6 is an example of a floating unit, and a pool cleaning robot of the pool cleaning system;

FIG. 12 is an example of a floating unit, and a pool cleaning robot of the pool cleaning system;

FIG. 14 is an example of a floating unit that has an anemometer; and

DETAILED DESCRIPTION OF EMBODIMENTS

"Swimming pool" or "pool" mean any spa or tank or any reservoir containing liquid.

Because the apparatus implementing the present invention is, for the most part, composed of optical components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

There may be provided a floating unit that may include an inductive charger that may include a contactless charging unit that is arranged to charge a pool cleaning robot in a contactless manner. In order to provide enough power to the pool cleaning robot (and enable the pool cleaning robot to clean the pool for relatively long cleaning periods) the floating unit should receive power via a cable. The floating unit may be implemented in existing pools, and does not require to retrofit the pool to include a fixed wireless charging unit. Furthermore—the location of the external power source and the location of the floating unit can be determined by the user, and may be changed upon user request—thereby allowing adjustments and eases the installation of the system.

The charging is contactless in the sense that the contactless charging unit (or a contactless charging element of said unit) of the floating unit and a contactless charged unit (or a contactless charging element) of the pool cleaning robot do not need to contact each other during the charging process.

Thus—the pool cleaning robot may or may not contact the floating unit during the charging process.

Figure 2:
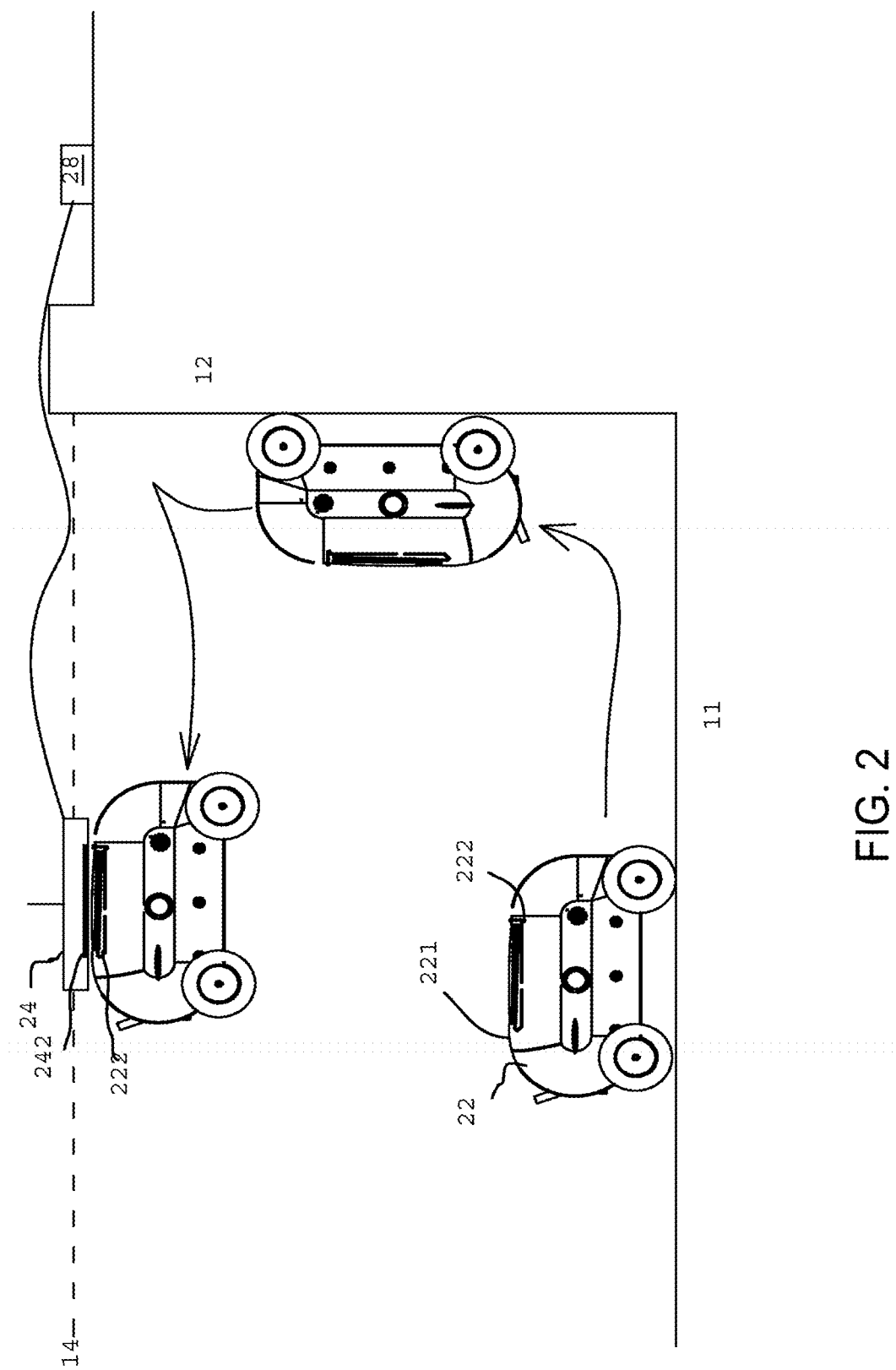
FIG. 2 is an example of a pool, a floating unit, and a pool cleaning robot of the pool cleaning system at different positions.

The contactless charged unit of the pool cleaning robot may be positioned anywhere in the pool cleaning robot—but it may be positioned proximate to an inner part of a housing (or cover or enclosure) of the pool cleaning robot. FIG. 2 illustrates a coil 223 of a contactless charged unit that is located at the top (below the housing) of the pool cleaning robot.

Figure 3:
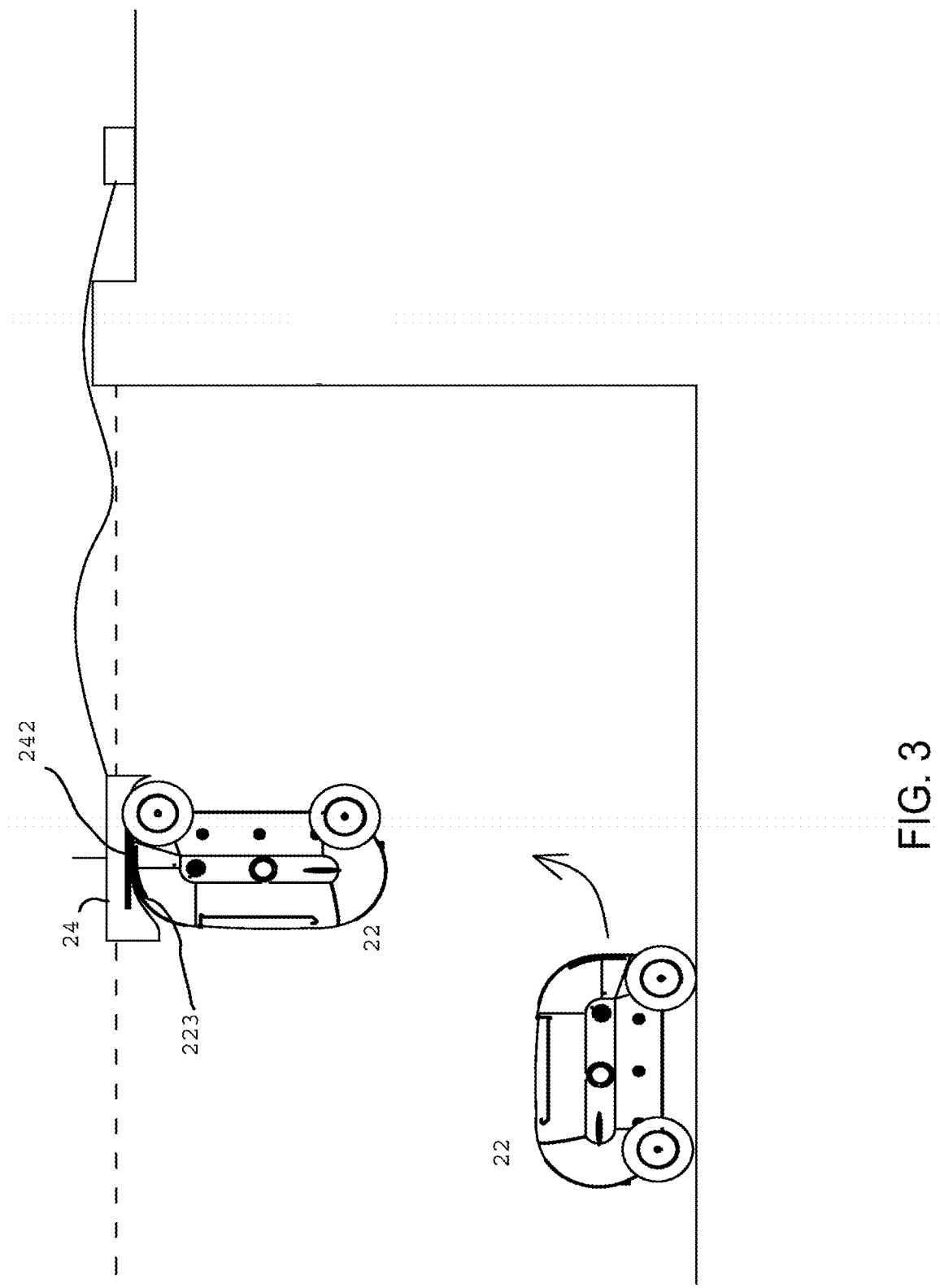
FIG. 3 is an example of a pool, a floating unit, and a pool cleaning robot of the pool cleaning system at different positions.

FIG. 3 illustrates a coil 322 of a contactless charged unit that is located at the front (behind the housing) of the pool cleaning robot.

Charging by using a floating unit (a) does not require to install contactless charging units within the walls of the pool—thus it may be used in existing pools, (b) is cheaper than installing contactless charging units in existing pools and in new pools, (c) may replace a long power cord that is constantly connected to the pool cleaning robot, (d) may enable to easily determine (and/or change) the location of the floating inductive charger, and (f) provides a safe method (contactless) for charging the pool cleaning robot.

The pool cleaning robot may navigate towards the floating unit using a known (or predefined or estimated) location of the floating unit, and by using one of more sensors such as image sensors, sonar, radar, electromagnetic sensors, and the like. The pool cleaning robot may autonomously move towards the unit and/or may move under the control (at least partially) of an external device or user.

The floating unit may include one or more transmitters for transmitting homing beacons and/or information about the location of the floating inductive charger.

The floating unit may remain substantially static (pending to wind and/or pool water condition) when the pool cleaning robot progresses towards the floating unit.

It is assumed in this specification that the floating unit may not remain fully static or immobile as it is not attached to any solid pool structure, such a wall or a portion of a wall, a ladder, a ledge and the like.

The floating unit may move freely towards, away and sideways from the pool cleaning robot whereby, the nature of the movements are rolling from side-to side, pitching and forward or backwards sideways drifting in relation to the pool cleaning robot.

The floating unit may sense the spatial relationship between the floating unit and the pool cleaning robot (using one or more sensors of any type) and may inform the pool cleaning robot or yet another computerized system about the spatial relationship.

The pool cleaning robot may sense the spatial relationship between the pool cleaning robot (using one or more sensors of any type) and the floating unit and may adjust its approach trajectory according to the constantly changing spatial relationship.

It is a major objective of this specification for the pool cleaning robot to travel in the swimming pool to connect with the internal charging surface of the charging float in one single motion or 'in-one-go', without the necessity to perform another or a secondary corrective trajectory to connect with the said float.

Nevertheless, the trajectory program to connect with the charging float inherently includes a reconnect trajectory procedure for the event of a last moment failure or a perceived, pre-calculated failure to complete a linear, single motion docking procedure with the charging float. In such a case, the pool cleaning robot may want to avoid a miss or an uncontrolled collision that will divert the charging float off location (albeit at very low speeds and impacts) requiring to perform a regenerated trajectory approach to connect to the charging float.

The pool cleaning robot may be configured to monitor the movement of the floating unit (for example while cleaning the pool when moving in the pool without cleaning the pool) and to determine a parameter related to a movement of the floating unit. The parameter may include the amount of movements, the repetitiveness of the movement, the angular deviations (tilt) and/or any other parameter that may provide an indication regarding a chances of succeeding to perform the charging of the pool cleaning robot.

For example—strong wind may cause the floating unit to move dramatically from tile angle to the other any may reduce the chances of successfully maintaining (or even forming) the small distance between the wireless charging elements of the floating unit and the pool cleaning robot together.

Thus the pool cleaning robot may delay the charging process when it determines that these chances are below a threshold (for example—below 30, 40, 50, 60 or 70%) and even reduce its battery power consumption (stop the cleaning, clean more slowly or otherwise reduce its power consumption) till there are better chances of succeeding to power the pool cleaning robot.

The same evaluation may be executed during the approach towards the floating unit—the pool cleaning robot may determine to stop the approach and wait (for example at least 5, 10, 15, 20, 25, 30, 35 minutes and even more) till the water is calmer (or otherwise the chances of success are better).

The floating unit and/or the pool cleaning robot may determine to stop a charging process if either decides that the chances of completing the charging process are lower than a threshold.

The frequency and/or duration of the charging periods may be determined based on the movements of the floating unit and/or the turbulence—for example it may be easier to maintain the small distance (within the charging range) between the pool cleaning robot and the floating unit for longer periods when the water is calmer. The pool cleaning robot may determine, even when its battery is relatively full (and may still power the pool cleaning robot to perform some cleaning operation—for example may still clean the pool for more than 5, 10 or 20 minutes) decide to initiate a charging operation—when the water is relatively calm and/or the floating unit is relatively stable.

It should be noted that the floating unit itself may determine its own movement parameter and either determine whether charging is possible and/or may send the parameter to the pool cleaning robot (or to a third entity such as a computer) that may determine whether the performing a charging attempt/what is the duration and timing of the charging attempt.

Additionally, or alternatively, the floating unit may instruct the pool cleaning robot how to move based on the sensed spatial relationship.

The floating unit may include additional components or may belong to a floating unit that includes additional components. These additional components may include, for example, any sensors for sensing and/or analyzing the water of the pool, illumination means, a chemical material dispenser, communication means, a propulsion unit for moving the floating unit, and the like.

For example—the floating unit may include (in addition to the contactless charging unit) at least one out of
(a) a chemical material dispenser
(b) a Biological or chemical water analysis module
(c) a pool anti drowning or unauthorized entry alarm (camera, acoustic, pressure)
(d) a floating battery
(e) a surface motorized skimmer
(f) or float for a variety of applications.

The pool cleaning robot can be charged while being submerged or semi submerged in the pool water.

The pool cleaning system may include one or more of the following elements:
  a. a pool cleaning robot that may include
    i. an electromagnetic induction coil 222
    ii. hollow housing that has a front section side, rear, left side, right side, upper and lower sides. 510
    iii. a filtering unit 501
    iv. a moveable or detachable cover or lid that may be opened to remove the filter. 511
    v. an inlet for allowing un-filtered fluid to enter the housing and be filtered by the filtering unit; 512
    vi. an outlet for allowing filtered fluid to exit the pool cleaning robot;
    vii. a propulsion mechanism. It may include, for example jets and/or at least one drive motor 502
    viii. one or more sensor for sensing the vicinity of the pool cleaning robot; 503
    ix. a controller for controlling the operation and navigation of the pool cleaning robot. 504 x. A rechargeable battery 505 fed by the a electromagnetic induction coil.

xi. A communication module 506 for communicating with the floating unit and/or another entity.

xii. A processor (such as but not limited to an image processor) 507 for receiving sensed information (such as images), determining the location of the floating unit and/or determining the spatial relationship and/or estimating or determining the future location of the floating unit and/or determining a path of the pool cleaning robot towards the floating unit given the current movements of the floating unit.

b. a power supply that may be external to the pool and may be electrically coupled (for example tethered) to the floating unit c. a floating electric cable.

d. a caddy or carriage adapted to carry the cleaner, power supply and the floating charger.

e. at least one on board rechargeable battery f. a floating unit that may include (each one of the following may be included within a housing of the floating unit, outside the housing, and the like):

i. a contactless charging unit that may include an electromagnetic induction coil system ii. a transducer of any other communication unit for communicating with the pool cleaning robot.

iii. electromagnetic sensors around the charging coils surface iv. wireless communications means to communicate with smart computer devices, the internet, a Bluetooth® device, a Wi-Fi® or a Li-Fi device.

The floating device may communicate its own status wirelessly or act as an intermediary for the submerged or semi submerged pool cleaning robot.

Communications between Pool cleaning robot and/or float with the end user may be performed by means of a dedicated remote control The electromagnetic sensors of the pool cleaning robot and of the floating unit may be used for aligning the pool cleaning robot and of the floating unit during an attachment procedure and to also keep both attached during the charging process and to disengage when charging ends.

A top cover or lid of the pool cleaning robot that may comprise induction coils

Each one of the contactless charging unit and the contactless charged unit may include, in addition to the coils, conductors that are electrically coupled to the coils.

In the contactless charging unit, the coil may be connected to the power cord, to a power regulating circuit, to a rechargeable battery of the floating unit.

In the contactless charged unit, the coil may be connected to a power regulating circuit, to a rechargeable battery of the pool cleaning robot.

A coil is merely an example of a contactless charging element.

A electronic control system control system comprising a PCB and memory capacity that controls the entire operation of the pool cleaning system and its sensors The pool cleaning system may comprise such sensors as: camera(s), accelerometer, acoustic/sonar sensor, Li-Fi sensor, RPM sensors, infra-red sensor, laser sensor, GPS communications, gyroscope, compass and the like The pool cleaning robot may have any other component that allows the pool cleaning robot to clean submerged parts of the pool. For example—the pool cleaning robot may include one or more brush wheels for scrubbing submerged parts of the pool, an intermediary brush (not shown) and the like.

There may be provided a autonomous battery powered pool cleaning system that comprises a floating unit that may float freely on the pool water surface; whereby the said floating unit includes a contactless charging unit that may be wired to an electrical power supply (for example—by means of a tethered cable); whereby the pool cleaning robot can autonomously and automatically navigates to and then travels vertically to attach itself to the said floating unit in order to start charging its on-board batteries; at charging end the pool cleaning robot disengages from the said floating unit to continue cleaning the pool.

The said physical attachment to the said floating unit may be performed by the following steps:

a) pool cleaning robot batteries signals control that battery pool is reduced and needs charging;

b) pool cleaning robot scans the environment to pinpoint float location c) travelling on the pool floor or on pool wall until vertically underneath the floating unit or in the vicinity of the floating unit.

d) if underneath, pool cleaning robot may apply downward vertical water jet thrusts to rise up to water level and to maneuver to the exact matching charging surface of the float charger.

e) in the vicinity of the floating unit, such as in a substantially vertical wall climbing position, the pool cleaning robot will maneuver to the exact matching charging surface of the float charger. The pool cleaning robot may be in a substantially horizontal position to the water surface or to the bottom of the pool.

f) in another embodiment, the coils may be located at one of the ends of the pool cleaning robot so the attachment position would be in an upright position.

g) In order to travel to an upright position that is vertical to the water surface or to the bottom of the pool, rear and side jets may utilized.

h) upon arriving to the vicinity of the float charger, whether in a vertical or in a horizontal position, the electromagnetic sensors signal and align the pool cleaning robot charging surface with the float charger charging surface.

i) The pool cleaning robot remains attached to the float charger for the duration of the charging and may disengage after termination.

j) end user may retrieve and pull the float charger and the robot out of the pool when required, disconnect the charger from the power supply and neatly store the components on a dedicated caddy or trolley.

Figure 1:
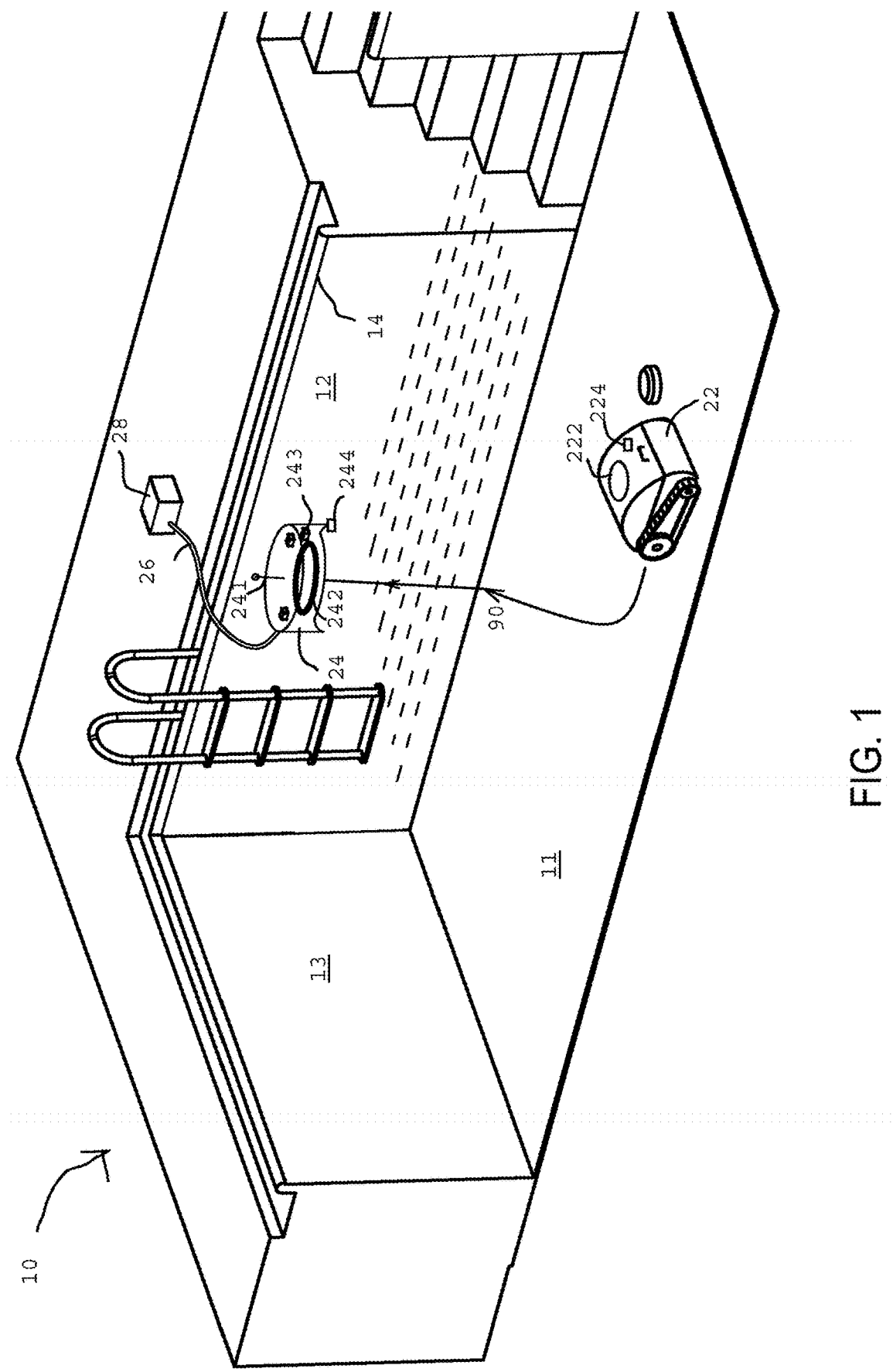
FIG. 1 is an example of a pool and of a pool cleaning system.

FIG. 1 illustrates pool 10, pool cleaning robot 22, floating unit 24, power cable 26 and power source 28.

Pool 10 has bottom 11 and sidewalls (such as sidewalls 12 and 13). The waterline is denoted 14.

Pool cleaning robot 22 includes a coil 223 of a contactless charged unit and a sensor 224.

Floating unit 24 may include an antenna 241 (for wireless communication), a coil 242 of a contactless charging unit (which is electrically coupled to cable 26), and one or more sensors 243 and 244.

The pool cleaning robot 22 travels along a path 90 that leads it from the bottom of the pool towards the floating unit 24.

FIG. 2 illustrates the pool cleaning robot at different positioned—at the bottom of the pool, climbing sidewall 12 and contacting the floating unit (or at least being positioned in proximity to the floating unit 14)—thereby allowing a contactless charging process of the pool cleaning robot.

FIG. 2 illustrates a coil 222 of the contactless charged unit that is positioned below the top 221 of the housing of the pool cleaning robot.

FIG. 2 also shows a coil 242 of a contactless charging unit of the floating unit. During the contactless charging process coils 242 and 222 do not touch each other but are close to each other (for example are up to 6 centimeters from each other).

FIG. 3 illustrates a coil 223 of the contactless charged unit that is positioned near the front edge of the housing of the pool cleaning robot.

During the contactless charging process coils 242 and 223 do not touch each other but are close to each other (for example are up to 6 centimeters from each other).

Figure 4:
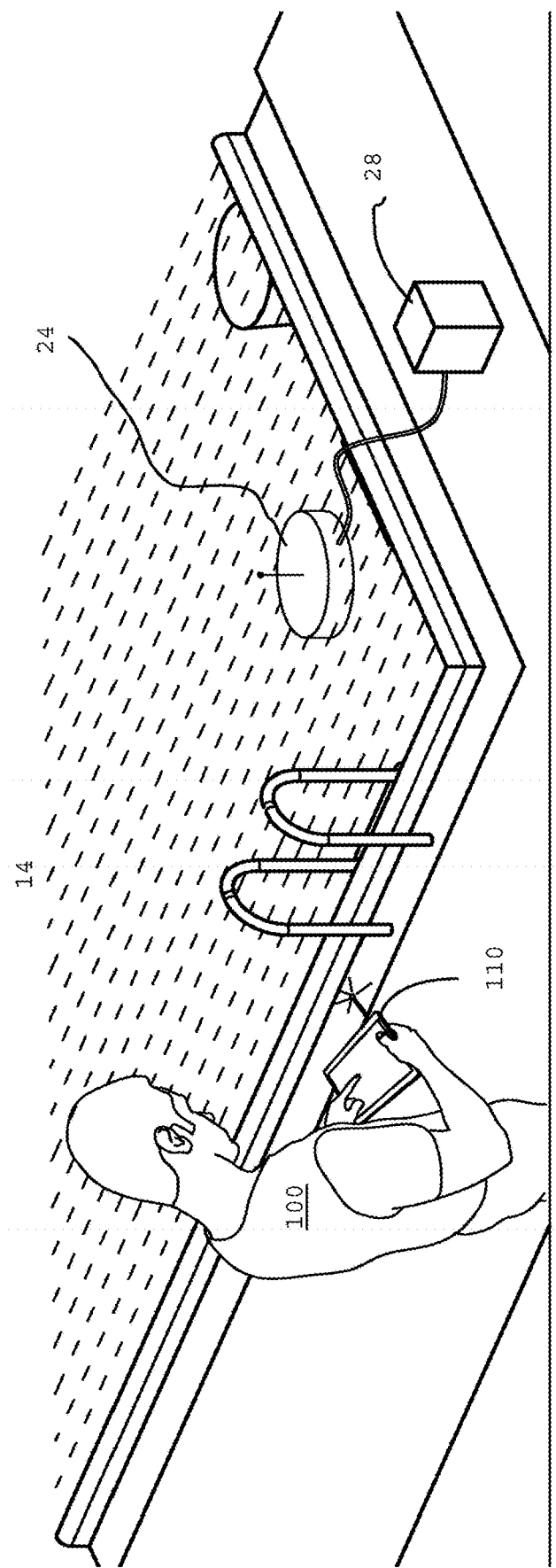
FIG. 4 is an example of a user, a pool, a floating unit, and a pool cleaning robot of the pool cleaning system.

FIG. 4 illustrates a user 100 that has a mobile computerized device 110 that may be used for controlling the floating unit and/or the pool cleaning robot.

Figure 5:
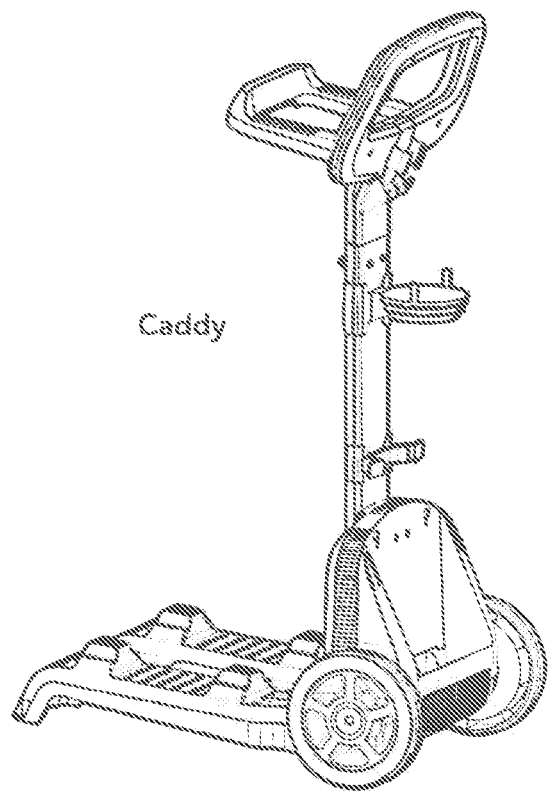
FIG. 5 is an example of a cradle.

FIG. 5 depicts a trolley or a caddy with space to carry and to store the pool cleaning robot, its power supply and the floating charger.

FIG. 6 illustrates the floating unit 24 as including a upper portion 2411 and a lower portion 2419 that extends below the upper portion (that may float above the water)—and includes a second contactless charging element 242 (such as but not limited to a coil or any inductor), while the pool cleaning robot 22 includes a first contactless charging element 222 (such as but not limited to a coil or any inductor) located at the top of the pool cleaning robot—within or outside the housing of the pool cleaning robot.

Figure 7:
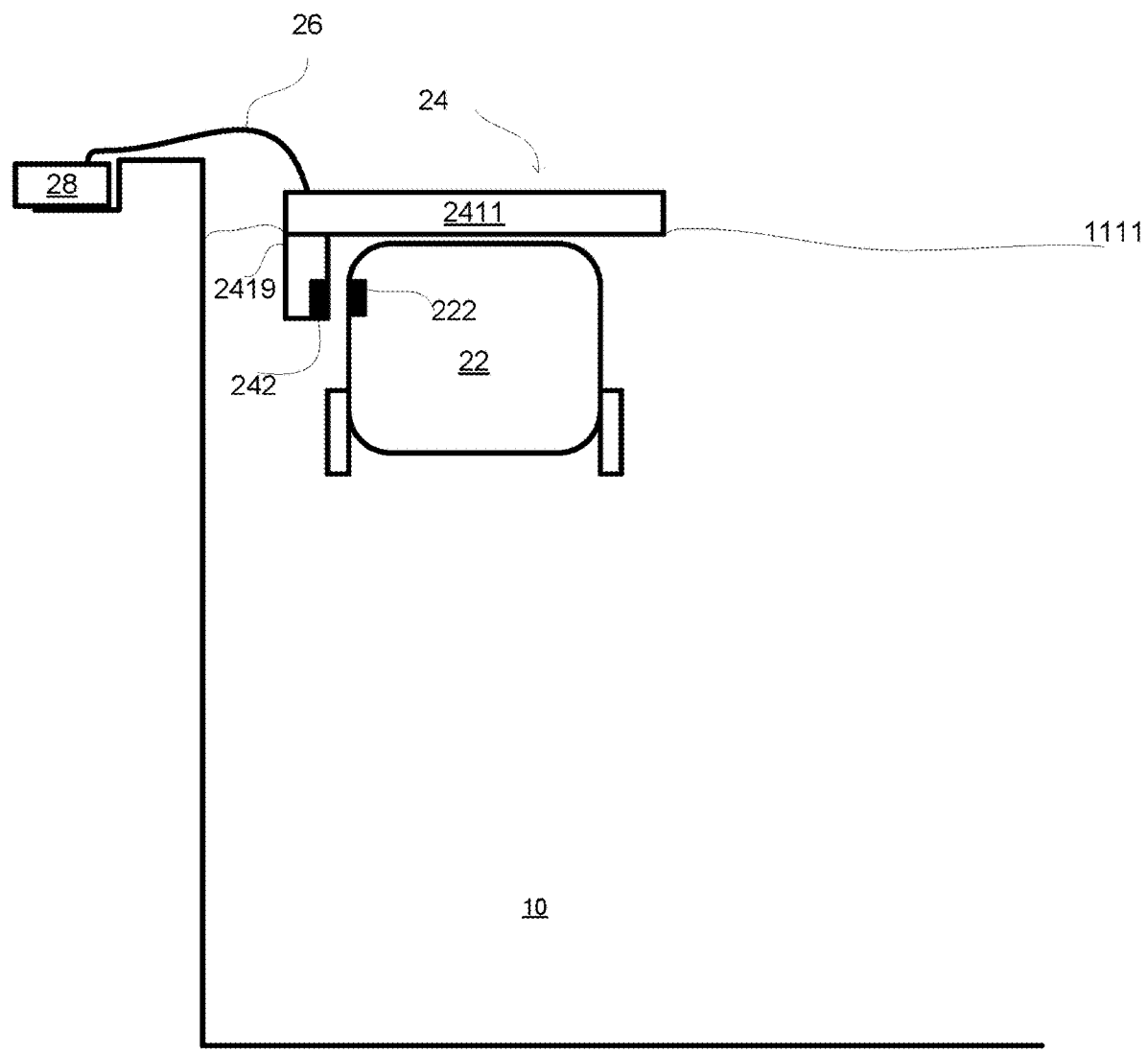
FIG. 7 is an example of a pool, a floating unit, and a pool cleaning robot of the pool cleaning system.

FIG. 7 illustrates pool 10, waterline 1111, power cable 26, power source 28, floating unit 24 that includes a upper portion 2411 and a lower portion 2419 that extends below (at an one side) of the upper portion (that may float above the water)—and includes a second contactless charging element 242 (such as but not limited to a coil or any inductor), while the pool cleaning robot 22 includes a first contactless charging element 222 (such as but not limited to a coil or any inductor) located at the top of the pool cleaning robot—within or outside the housing of the pool cleaning robot.

Figure 8:
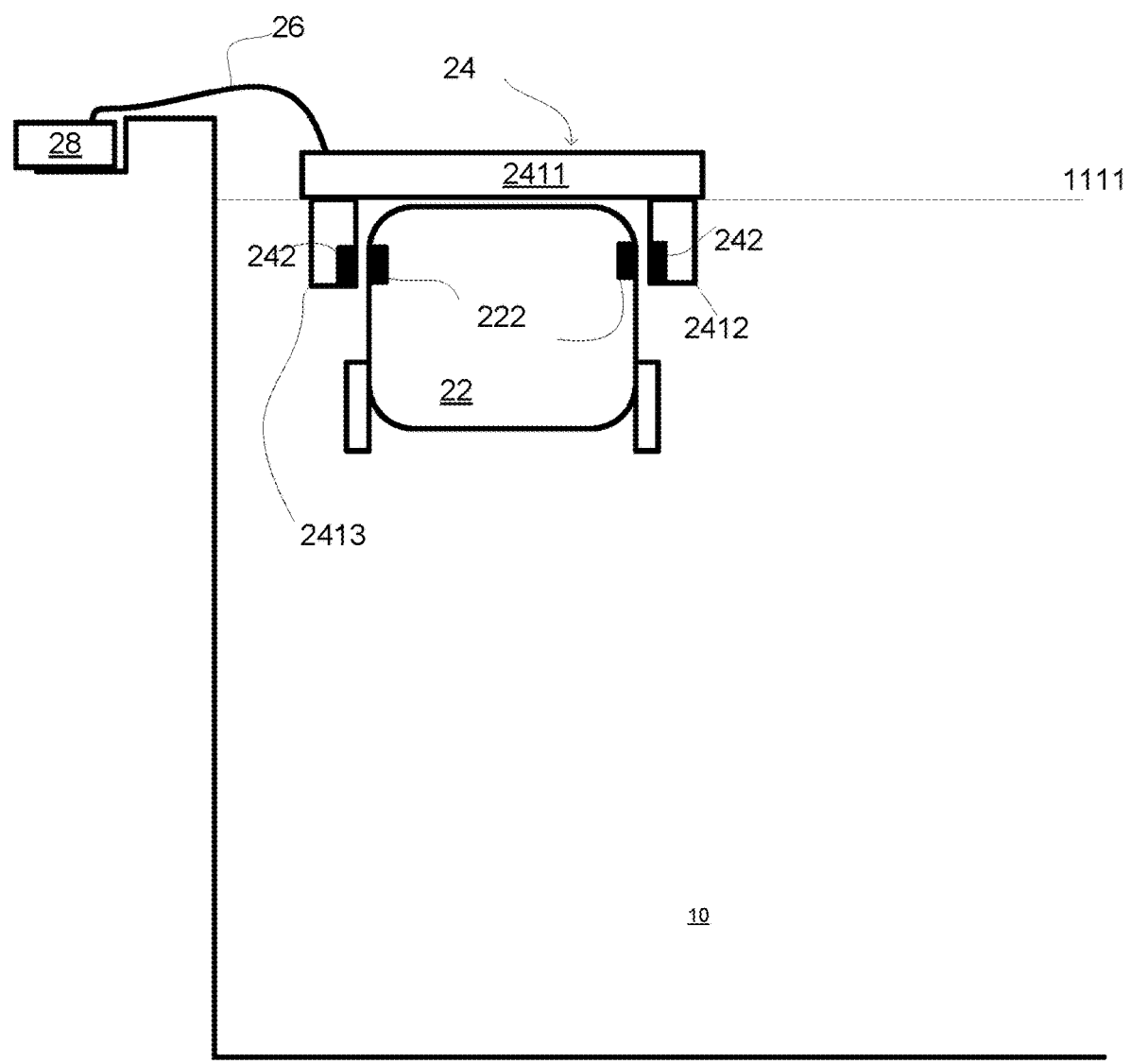
FIG. 8 is an example of a pool, a floating unit, and a pool cleaning robot of the pool cleaning system.

FIG. 8 illustrates pool 10, waterline 1111, power cable 26, power source 28, floating unit 24 that includes a upper portion 2411 and two lower portions 2412 and 2413 that extend below (and near opposite sides of) of the upper portion (that may float above the water). Each of the two lower portions includes a second contactless charging element 242 (such as but not limited to a coil or any inductor), while the pool cleaning robot 22 includes a pair of first contactless charging elements 222 (such as but not limited to a coil or any inductor) located at both sides of the pool cleaning robot and the top of the pool cleaning robot—within or outside the housing of the pool cleaning robot.

Figure 9:
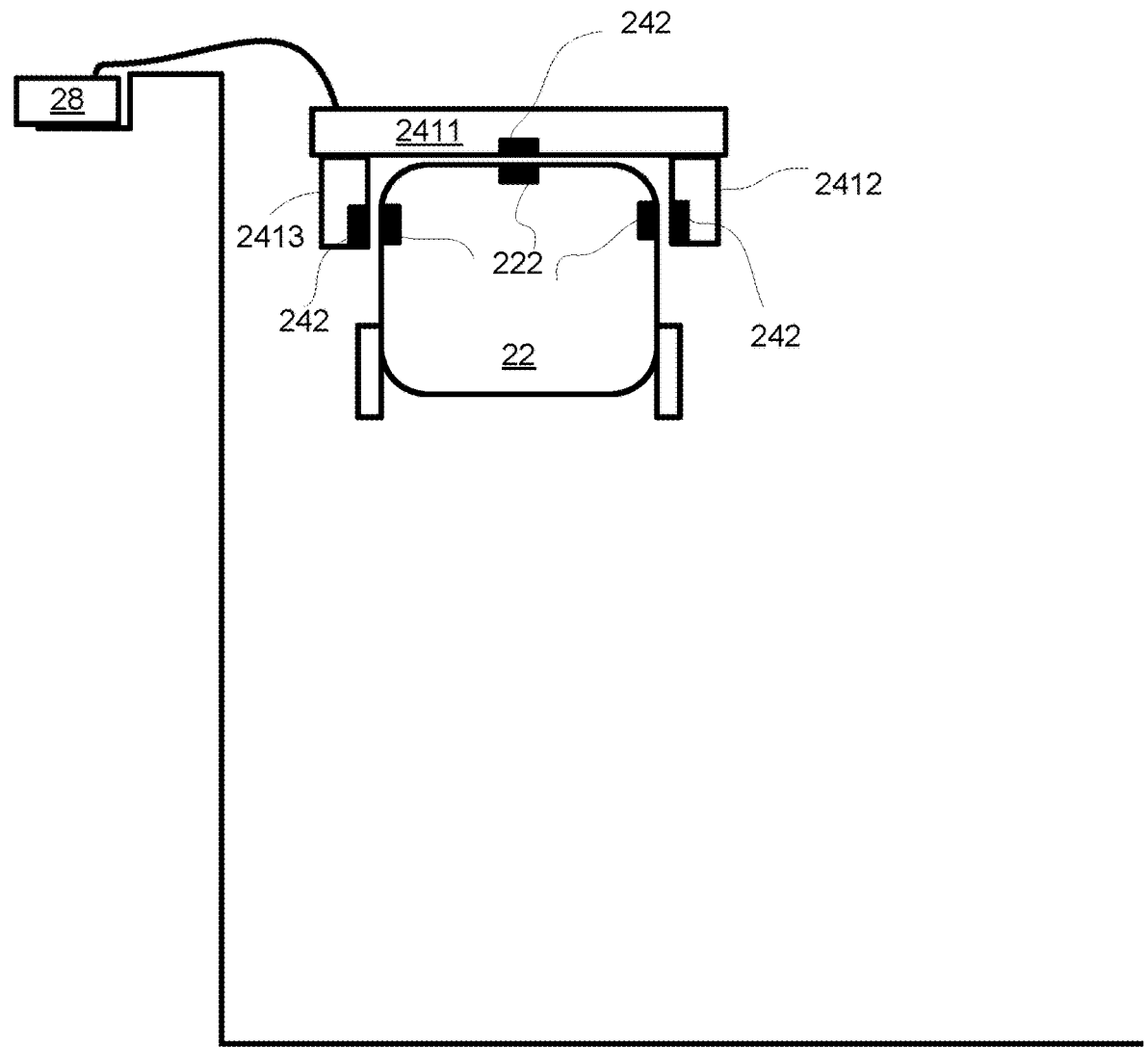
FIG. 9 is an example of a pool, a floating unit, and a pool cleaning robot of the pool cleaning system.

FIG. 9 differs from FIG. 8 by illustrating three first contactless charging elements 222 located at top of the pool cleaning robot, at upper parts of both sidewalls of the pool cleaning robot—and also illustrating three corresponding second contactless charging elements 242 located at each one of upper portion 2411, and the two lower portions 2412 and 2413.

Figure 10:
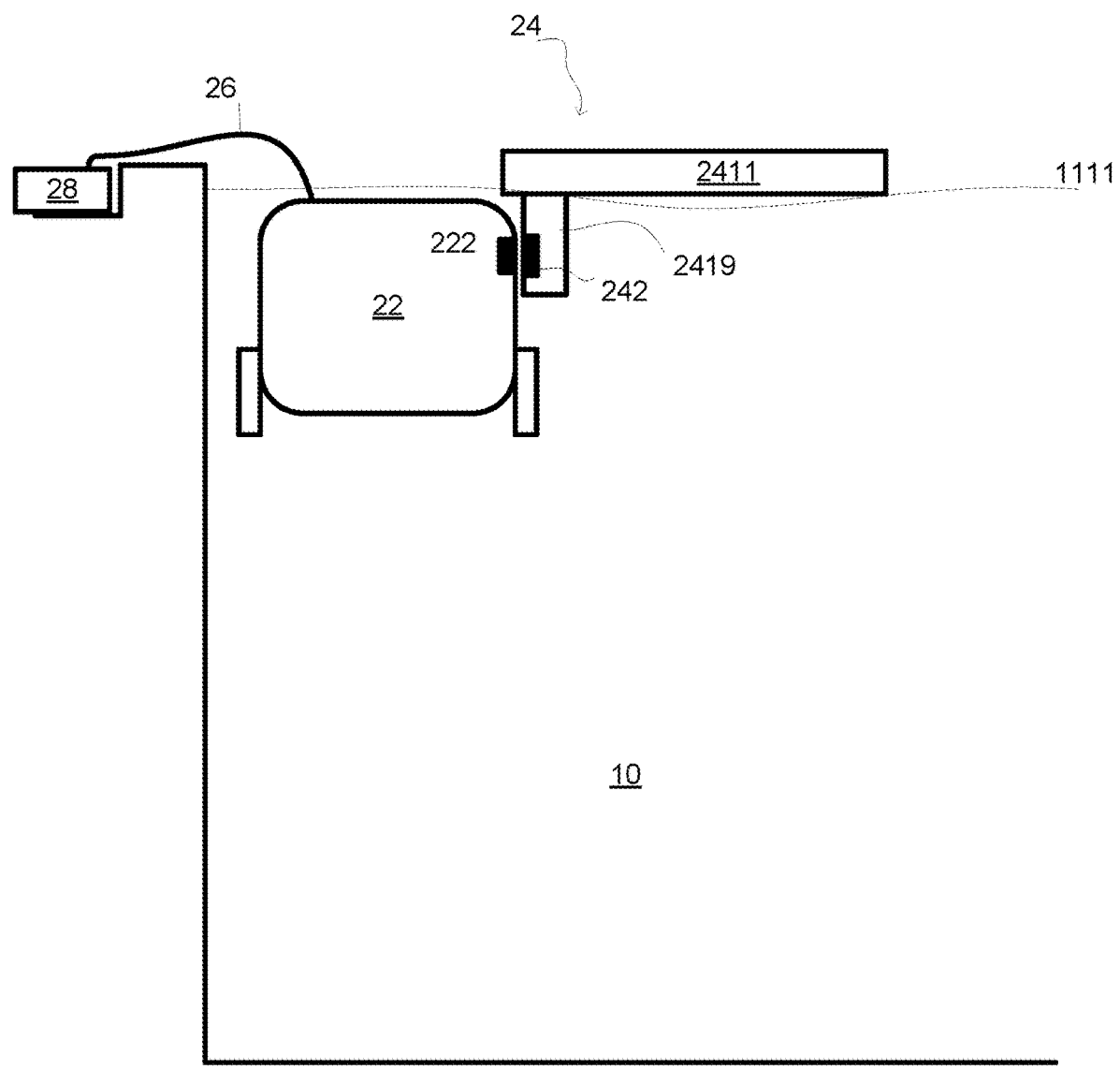
FIG. 10 is an example of a pool, a floating unit, and a pool cleaning robot of the pool cleaning system.

FIG. 10 illustrates pool 10, waterline 1111, power cable 26, power source 28, floating unit 24 that includes a upper portion 2411 and a lower portion 2419 that extends below (at an one side) of the upper portion (that may float above the water)—and includes a second contactless charging element 242 (such as but not limited to a coil or any inductor), while the pool cleaning robot 22 includes a first contactless charging element 222 (such as but not limited to a coil or any inductor) located at the top of the pool cleaning robot—within or outside the housing of the pool cleaning robot.

FIG. 10 differs from FIG. 7 by the spatial relationship between the pool cleaning robot 22 and the floating unit 24 and by the location of the second contactless charging element 242.

In FIG. 7 the second contactless charging element 242 was located at the inner end of lower portion 2419—and the pool cleaning robot was positioned directly below the upper portion 2411 during the charging. In FIG. 10 the second contactless charging element 242 is located at the external end of lower portion 2419—and the pool cleaning robot was not positioned directly below the upper portion 2411 during the charging—it is still submerged but is located at the side of the upper portion.

Figure 11:
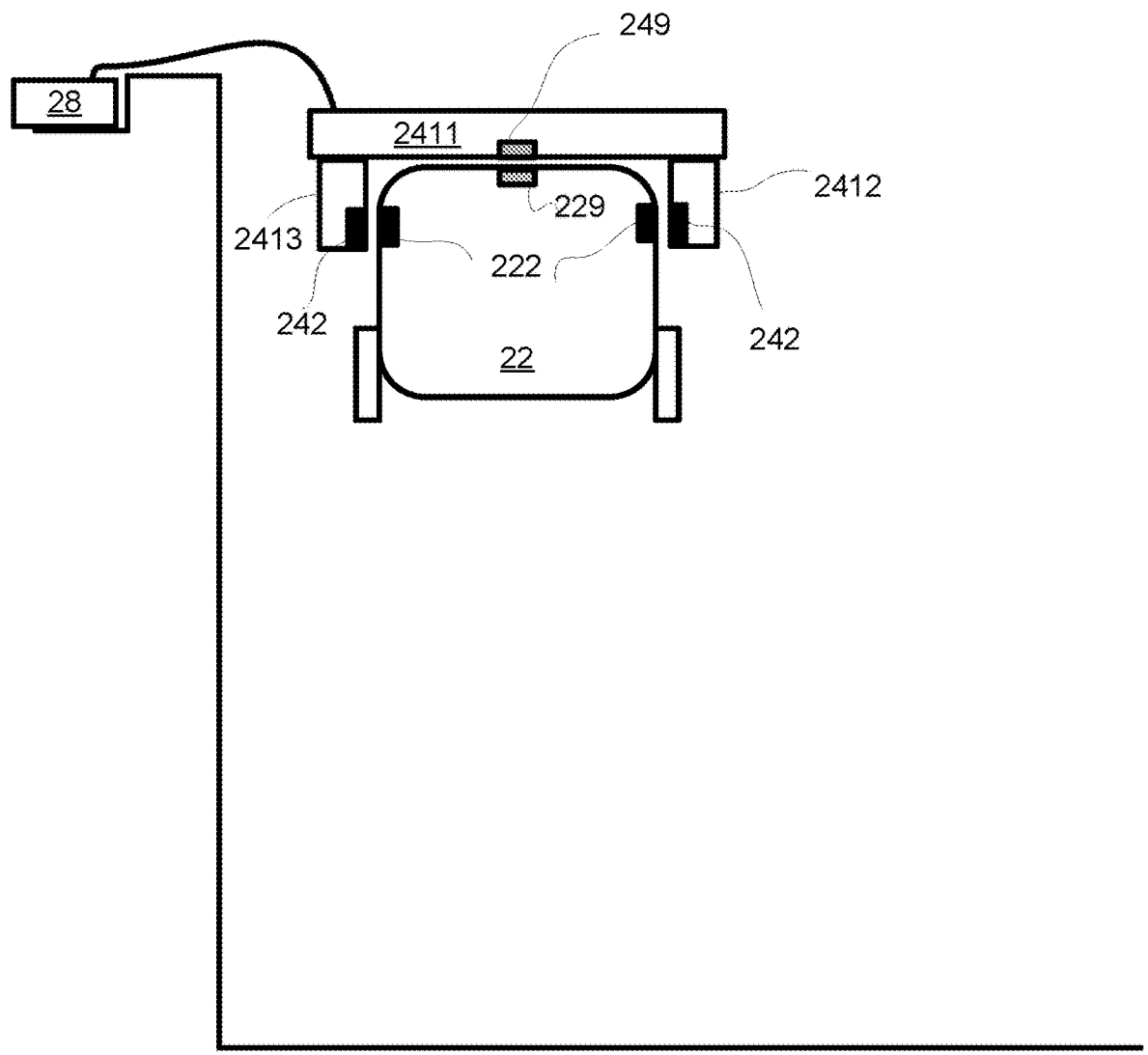
FIG. 11 is an example of a pool, a floating unit, and a pool cleaning robot of the pool cleaning system.

The pool cleaning robot may be magnetically coupled to the floating unit during the charging process. The magnetically coupling may be executed by having one or more magnets within the pool cleaning robot and in the floating unit—see FIG. 11 magnet 229 in the pool cleaning robot and magnet 249 in the floating unit. The magnet may be located within (or attached) to only one of the pool cleaning robot and the floating unit—and the other one (of the pool cleaning robot and the floating unit) may include an element made of a magnetic material. The magnet may be a permanent magnet or an electromagnet in which current is provided during the charging period and may not be fed (or be substantially reduced) once the charging period ends.

Figure 13:
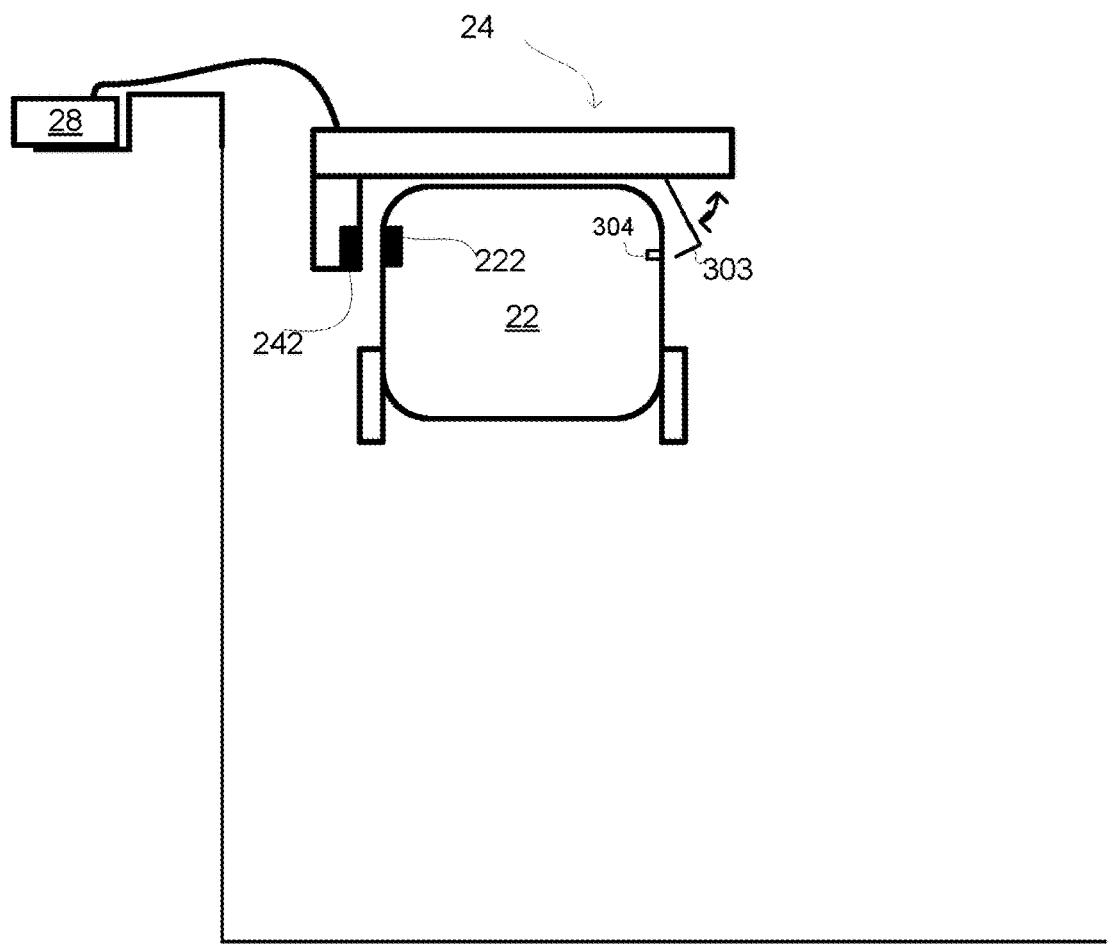
FIG. 13 is an example of a floating unit, and a pool cleaning robot of the pool cleaning system.

The pool cleaning robot may be mechanically coupled to the floating unit during the charging process. Any mechanical unit, device, or mechanism may be used. The mechanically coupling may be performed by one or more element of the floating unit, by one or more element of the pool cleaning robot and the like. The mechanical coupling may be implemented by any locking and unlocking mechanism (denoted 302 in FIG. 12), by a rigid or flexible attachment elements (denoted 301 in FIG. 12), by a hook 303 and opening 304 (FIG. 13), and the like. The locking and unlocking may include any number of elements, may be controlled by the floating unit, may controlled by the pool cleaning robot, and the like.

FIG. 14 illustrates a floating unit that include an anemometer 120.

The anemometer 120 includes a housing 122 that may be hollow and have a cylindrical interior (or other shaped interior) 122 that surrounds the fins 121 of the anemometer. The fins 121 may be rotated by the wind and turn around an axis 124. The axis may be mechanically coupled to the housing 122 via support elements 123. The housing 122 may be supported by support elements 125 such as legs.

The anemometer may indicate the rate and direction of drifting of the float if a wind at the water surface of the pool places strain on the float to deflect it from its location. Furthermore, the wind direction and its intensity may be used to forecast where the float may be heading to and where it may be located in order to assist with the plotting of the pool cleaning robot trajectory to connect with the charging float.

Figure 15:
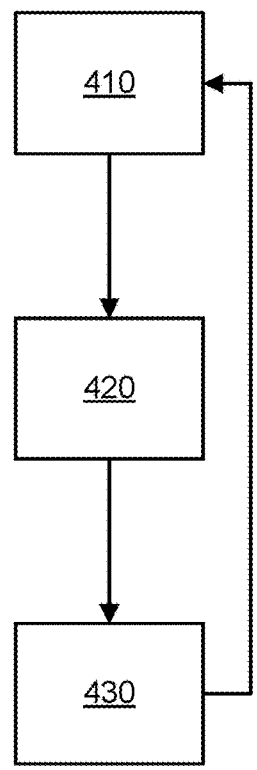
FIG. 15 is an example of a method.

FIG. 15 illustrates method 400.

Method 400 may be for charging a pool cleaning robot.

Method may include steps 410, 420 and 430.

Step 410 may include positioning a first wireless charging element of a pool cleaning robot within a charging range of a second wireless charging element of a floating unit. The floating unit may be electrically and mechanically coupled via one or more coupling elements to an external unit. The positioning may include moving at least one of the pool cleaning robot and the floating unit. The one or more coupling elements may include one or more cables, one or more wires, one or more nets, and the like.

The charging range may be limited to few millimeters (for example between 0.1 and 9 millimeters). Other values of the charging range may be provided—for example more than few millimeters.

The floating unit may move (for example by the wind and/or flows of the fluid within the pool), whereas the movement may be repetitive or not. The positioning may include estimating the future movements of the floating unit (by the pool cleaning robot or the floating unit) and wherein the propagating takes into account the future movements (until reaching the floating unit).

Step 420 may include wirelessly charging, by the second wireless charging element, the first wireless charging element. The charging occurs when the first wireless charging element may be within the charging range of the floating unit.

Step 410 may include at least one of the following:
a. Detecting, during the positioning and by at least one of the floating unit and the pool cleaning robot, a spatial relationship between the pool cleaning robot and the floating unit; and
b. Positioning the first and second charging elements within the charging range in response to the spatial relationship.
c. Instructing the pool cleaning robot (by the floating unit or another entity) to move based on the spatial relationship.
d. The moving the floating unit based on the spatial relationship.
e. Moving the floating unit to a predefined area that may be known to the pool cleaning robot.
f. Sensing by the floating unit an impact of a wind on the floating unit.
g. Positioning the first and second charging elements within the charging range in response to the impact of the wind.
h. Moving the pool cleaning robot below the floating unit.
i. Rotating the pool cleaning robot or performing any propagating path by the pool cleaning robot.
j. Attaching the pool cleaning robot to the floating unit during a wireless charging period.
k. Mechanically coupling the pool cleaning robot to the floating unit, at least during the wireless charging.
l. Magnetically coupling the pool cleaning robot to the floating unit, at least during the wireless charging.
m. Calculating a meeting point between the pool cleaning robot and the floating unit.
n. Based on the meeting point determine whether to progress (for example move the pool cleaning robot) along a current path towards the floating unit.
o. Based on the meeting point determining whether to change current path—redirecting a progress towards the floating unit.
p. The redirection may be required when the current progress path will lead the pool cleaning robot to reach the floating unit at a position that increases an instability of the floating unit docking. For example— meeting the floating unit away from the center of the floating unit.
q. Calculating a future position and orientation of the floating unit due to floating unit movements selected out of rolling, pitching and sideways drifting, and directing the pool cleaning robot towards the future position.
r. delaying a charging of the pool cleaning robot when movements of the floating unit exceed a threshold.

Step 430 may include moving the pool cleaning robot away from the floating unit—after ending the charging.

Any combination of a subject matter of any claim may be provided. For example, for each set of claims that includes a single independent claim and multiple dependent claims— each dependent claim may depend on any other dependent claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

We claim:

1. A method for charging a pool cleaning robot, the method comprises:
moving the pool cleaning robot without colliding with a floating unit in a manner that diverts the floating unit from a current location of the floating unit;
positioning a first wireless charging element of a pool cleaning robot within a charging range of a second wireless charging element of the floating unit; wherein the floating unit is electrically and mechanically coupled to an external power source, wherein the positioning comprises moving at least one of the pool cleaning robot and the floating unit; and
wirelessly charging, by the second wireless charging element, the first wireless charging element; wherein the charging occurs while maintaining the first wireless charging element within the charging range of the floating unit, despite movements of the floating unit.

2. The method according to claim 1 comprising delaying the charging of the pool cleaning robot by the floating unit when determining, by the pool cleaning robot, that the chances of successfully powering the pool cleaning robot are below a threshold.

3. The method according to claim 1 comprising determining at least one of a duration of charging and a frequency of charging of the pool cleaning robot based on at least one of movements of the floating unit and turbulence.

4. The method according to claim 1 comprising determining at least one of a duration of charging and a frequency of charging of the pool cleaning robot based on a movement parameter determined by the floating unit.

5. The method according to claim 1 comprising travelling on a floor of a pool or on a pool wall, by the pool cleaning robot, until the pool cleaning robot is vertically underneath the floating unit; and moving the pool cleaning robot vertically to attach the pool cleaning robot to the floating unit to a position in which the first wireless charging element is within a charging range of a second wireless charging element of a floating unit.

6. The method according to claim 1 comprising moving the pool cleaning robot by maintaining a horizontal position of the pool cleaning robot to the water surface or to the bottom of the pool.

7. The method according to claim 1 comprising determining at least one of a duration of charging and a frequency of charging of the pool cleaning robot based on a movement parameter determined by the floating unit.

8. A pool cleaning system, comprising:
a floating unit and a pool cleaning robot;
wherein at least one of the floating unit and the pool cleaning robot is configured to move to a position in which a first wireless charging element of the pool cleaning robot is within a charging range of a second wireless charging element of the floating unit;
wherein the pool cleaning system is configured to move without colliding with the floating unit in a manner that diverts the floating unit from a current location of the floating unit;
wherein the floating unit is electrically and mechanically coupled to an external power source; and
wherein the second wireless charging element is configured to charge the first wireless charging element, wherein the charging occurs while maintaining the first wireless charging element within the charging range of the floating unit, despite movements of the floating unit.

9. The pool cleaning system according to claim 8 wherein the pool cleaning system is configured to delay a charging of the pool cleaning robot by the floating unit when determining, by the pool cleaning robot, that the chances of successfully powering the pool cleaning robot are below a threshold.

10. The pool cleaning system according to claim 8 wherein the pool cleaning system is configured to reduce a battery power consumption of the pool cleaning robot when determining that a chances of successfully charging the pool cleaning robot are below a threshold.

11. The pool cleaning system according to claim 8 wherein the pool cleaning system is configured to determine at least one of a duration of charging and a frequency of charging of the pool cleaning robot based on at least one of movements of the floating unit and turbulence.

12. The pool cleaning system according to claim 8 wherein the pool cleaning system is configured to determine at least one of a duration of charging and a frequency of charging of the pool cleaning robot based on a movement parameter determined by the floating unit.

13. The pool cleaning system according to claim 8 wherein the pool cleaning system is configured to travel on a floor of a pool or on a pool wall, by the pool cleaning robot, until the pool cleaning robot is vertically underneath the floating unit; and move vertically to attach the pool cleaning robot to the floating unit to a position in which the first wireless charging element is within a charging range of a second wireless charging element of a floating unit.

14. The pool cleaning system according to claim 8 wherein the pool cleaning system is configured to move by maintaining a horizontal position of the pool cleaning robot to the water surface or to the bottom of the pool.

15. A non-transitory computer readable medium that stores instructions that once executed by a pool cleaning system, causes the pool cleaning system to:
move the pool cleaning robot without colliding with a floating unit in a manner that diverts the floating unit from a current location of the floating unit;
position a first wireless charging element of the pool cleaning robot within a charging range of a second wireless charging element of the floating unit;
wherein the floating unit is electrically and mechanically coupled to an external power source, wherein the positioning comprises moving at least one of the pool cleaning robot and the floating unit; and wirelessly being charged, by the second wireless charging element via the first wireless charging element; wherein the charging occurs while maintaining the first wireless charging element within the charging range of the floating unit, despite movements of the floating unit.

* * * * *